US012614808B2

(12) United States Patent
Hickey et al.

(10) Patent No.: US 12,614,808 B2
(45) Date of Patent: Apr. 28, 2026

(54) MANUFACTURING METHODS FOR BATTERY CELL SUPPORT ASSEMBLY WITH INTEGRATED THERMAL RUNAWAY MITIGATION

(71) Applicant: GM GLOBAL TECHNOLOGY OPERATIONS LLC, Detroit, MI (US)

(72) Inventors: Ryan P. Hickey, Austin, TX (US); Mohammad Kirmani, Troy, MI (US); Anthony M. Coppola, Rochester Hills, MI (US); Evan D. Griffith, Pleasant Ridge, MI (US); Daniel M. Wang, Royal Oak, MI (US); Kris Killen, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 506 days.

(21) Appl. No.: 18/326,162

(22) Filed: May 31, 2023

(65) Prior Publication Data

US 2024/0405346 A1 Dec. 5, 2024

(51) Int. Cl.
| | |
|---|---|
| *H01M 50/289* | (2021.01) |
| *H01M 10/658* | (2014.01) |
| *H01M 50/209* | (2021.01) |
| *H01M 50/227* | (2021.01) |
| *H01M 50/24* | (2021.01) |
| *H01M 50/383* | (2021.01) |

(52) U.S. Cl.
CPC ....... *H01M 50/289* (2021.01); *H01M 10/658* (2015.04); *H01M 50/209* (2021.01); *H01M 50/227* (2021.01); *H01M 50/24* (2021.01); *H01M 50/383* (2021.01)

(58) Field of Classification Search
CPC ............. H01M 50/289; H01M 50/209; H01M 50/227; H01M 50/24; H01M 50/383; H01M 10/658; Y02E 60/10
See application file for complete search history.

(56) References Cited

U.S. PATENT DOCUMENTS

| | | | | |
|---|---|---|---|---|
| 2021/0376403 A1* | 12/2021 | Schieler | .............. | H01M 10/647 |
| 2024/0128583 A1* | 4/2024 | Georgiadis | .......... | H01M 10/625 |

* cited by examiner

*Primary Examiner* — Eugenia Wang
(74) *Attorney, Agent, or Firm* — Quinn IP Law

(57) ABSTRACT

A method for constructing a cell support assembly with thermal runaway mitigation for a multi-cell rechargeable energy storage system (RESS) include forming a cell holder configured to support the RESS battery cells. The cell holder has a holder body defining a plurality of apertures arranged in rows, such that each aperture is configured to align and be in fluid communication with a cell vent of one of the RESS battery cells. Individual embodiments of the method also include various techniques of arranging a plurality of thermal-barrier strips and potting elements to align with apertures of the cell holder body and adhering the thermal-barrier strips to the potting elements and to the cell holder. The resultant cell support assembly operates to channel thermal runaway energy away from the affected battery cell(s) and out of the RESS enclosure without triggering thermal runaway in adjacent cells.

7 Claims, 10 Drawing Sheets

MANUFACTURING METHODS FOR BATTERY CELL SUPPORT ASSEMBLY WITH INTEGRATED THERMAL RUNAWAY MITIGATION

INTRODUCTION

The present disclosure relates to methods of manufacturing a battery cell support assembly with integrated thermal runaway mitigation for a multi-cell rechargeable energy storage system (RESS).

Typically, an electric energy generation and storage battery system includes one or more battery cells for powering a load. A plurality of battery cells may be arranged in close proximity to one another to generate a battery cell array or system, such as a battery module, pack, etc. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental, and ease-of-use benefits compared to disposable batteries.

Secondary batteries may be used to store electrical energy for future use and as a buffer between peak power generation and peak system loads, such as in stationary energy storage systems and electric vehicles (EVs). Particular chemistries of rechargeable batteries, as well as external factors, may cause internal reaction rates generating significant amounts of thermal energy. Exposure of a battery cell to elevated temperatures over prolonged periods may cause the cell to experience a thermal runaway event. Heat build-up in one cell may lead to the heat spreading to adjacent cells, thereby affecting the entire battery array. Accordingly, thermal energy needs to be effectively removed to mitigate heat build-up and consequent degradation of battery system performance.

SUMMARY

Embodiments of a method of constructing a cell support assembly for a multi-cell rechargeable energy storage system (RESS) include forming a cell holder configured to support the RESS battery cells. The cell holder has a holder body defining a plurality of apertures arranged in rows, such that each aperture is configured to align and be in fluid communication with a cell vent of one of the RESS battery cells. The method generally includes arranging a plurality of thermal-barrier strips and potting elements to align with apertures of the cell holder body and adhering the thermal-barrier strips to the potting elements and to the cell holder. The resultant cell support assembly operates to channel thermal runaway energy away from the affected battery cell(s) and out of the RESS enclosure without triggering thermal runaway in adjacent cells.

In addition to forming the cell holder, one embodiment of the method also includes arranging the formed cell holder inside a cavity between an upper mold and a lower mold. The cavity defines a first region configured to accommodate the formed cell holder and a second region configured to accommodate a plurality of potting elements, such that each potting element is arranged in one of the plurality of apertures. The method additionally includes introducing a potting element material into the second region of the cavity. The method additionally includes curing the potting element material inside the second region of the cavity to incorporate the plurality of potting elements into the formed cell holder, such that each potting element is arranged in one of the plurality of apertures and thereby forms a support sub-assembly. The method also includes separating the upper and lower molds to remove the formed support sub-assembly and adhering a plurality of thermal-barrier strips to the formed support sub-assembly to construct the cell support assembly. Each thermal-barrier strip extends parallel to a respective row of apertures, such that each potting element is arranged between a respective battery cell and the corresponding thermal-barrier strip. Each strip potting element is configured to adhere to the battery cell and to the corresponding thermal-barrier strip to maintain position of the battery cell on the formed cell holder. Each thermal-barrier strip is also configured to thermally insulate corresponding battery cells from gases expelled by neighboring battery cells during a thermal runaway. The method further includes separating the upper and lower molds to remove the constructed cell support assembly.

In addition to forming the cell holder, another embodiment of the method also includes adhering a plurality of thermal-barrier strips to the formed cell holder parallel to respective rows of apertures to thermally insulate corresponding battery cells from gases expelled by neighboring battery cells during a thermal runaway. The method additionally includes arranging the formed cell holder with the adhered plurality of thermal-barrier strips inside a cavity between an upper mold and a lower mold. The cavity defines a first region configured to accommodate the formed cell holder with the adhered plurality of thermal-barrier strips and a second region configured to accommodate a plurality of potting elements. The cavity is configured to arrange each potting element in one of the plurality of apertures. The method also includes introducing a potting element material into the second region of the cavity. The method additionally includes curing the potting element material inside the second cavity region to incorporate the plurality of potting elements into the formed cell holder with the adhered plurality of thermal-barrier strips. As a result, each potting element would be arranged in one of the plurality of apertures between a respective battery cell and the corresponding thermal-barrier strip and configured to adhere to the battery cell and to the corresponding thermal-barrier strip to maintain position of the battery cell on the formed cell holder. The method further includes separating the upper and lower molds to remove the constructed cell support assembly.

In addition to forming the cell holder, another distinct embodiment of the method also includes applying a potting element material onto a plurality of thermal-barrier strips to thereby form thereon and adhere thereto a plurality of potting elements. The method additionally includes adhering the plurality of thermal-barrier strips with the adhered plurality of potting elements to the formed cell holder. As a result, each thermal-barrier strip extends parallel to a respective row of apertures and is configured to thermally insulate corresponding battery cells from gases expelled by neighboring battery cells during a thermal runaway. Additionally, each potting element is then arranged in one of the plurality of apertures between a respective battery cell and the corresponding thermal-barrier strip and configured to adhere to the battery cell to maintain position of the battery cell on the formed cell holder.

In each embodiment of the method, introducing the potting element material into the second region of the cavity may include forming each of the potting elements from a non-self-leveling paste.

The non-self-leveling paste may include additives configured to match a thermal expansion coefficient of the potting elements with a coefficient of thermal expansion of the cell holder.

Each of the potting elements may include a flame-retardant material.

In each embodiment of the method, forming the cell holder may include constructing the cell holder from a glass-filled nylon.

Each of the thermal-barrier strips may have folded sides extending perpendicular to a respective row of apertures.

In each embodiment of the method, adhering the plurality of thermal-barrier strips to the formed support sub-assembly may be achieved via an adhesive coating one side of each respective thermal-barrier strip.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
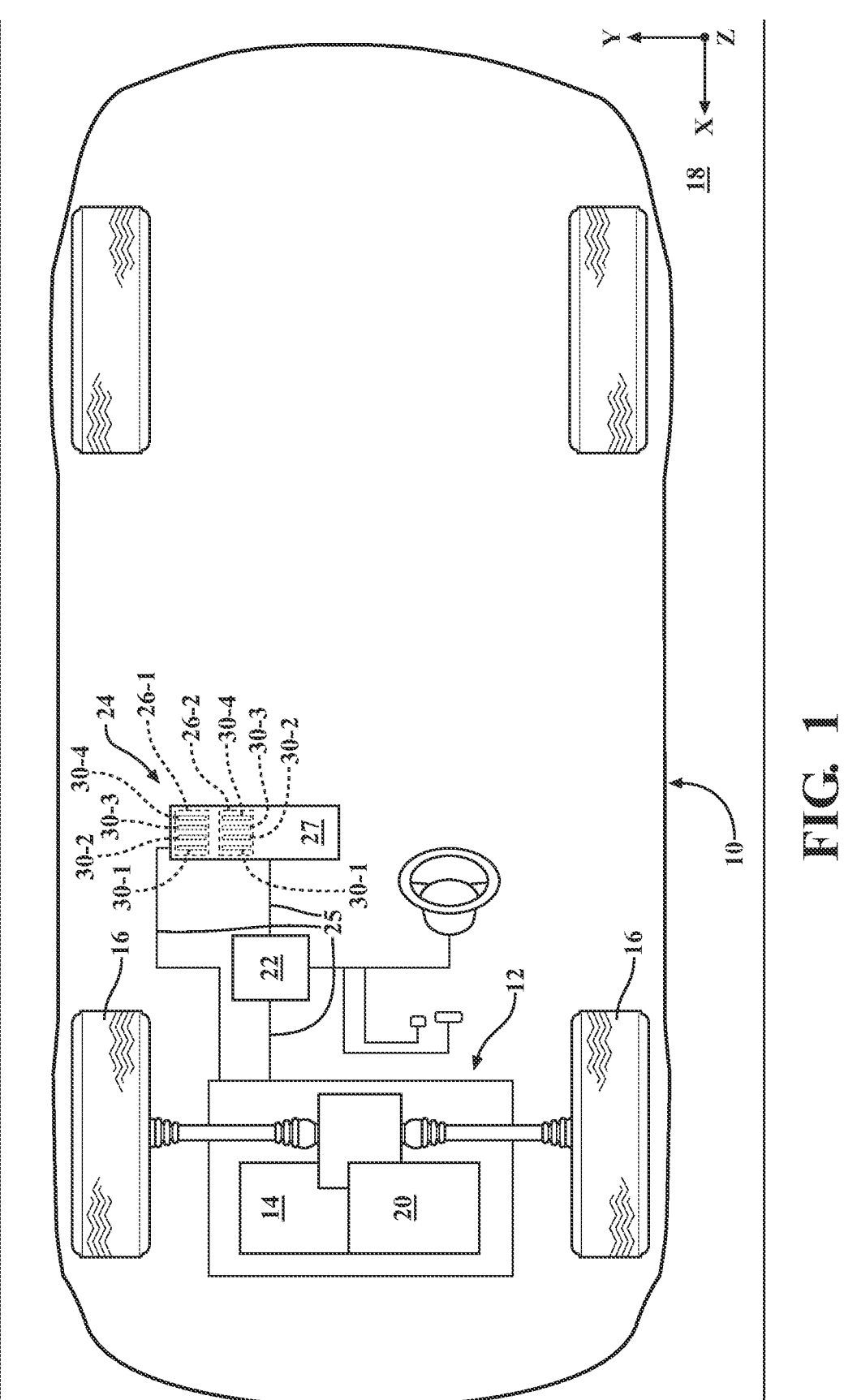
FIG. 1 is a schematic top view of an embodiment of a motor vehicle employing multiple power-sources and a multi-cell rechargeable energy storage system (RESS) configured to generate and store electrical energy used by vehicle systems including the power-sources.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a multi-cell rechargeable energy storage system (RESS) 24 configured to generate and store electrical energy through heat-producing electrochemical reactions for supplying the electrical energy to the power-sources 14 and 20. The electronic controller 22 may be a central processing unit (CPU) that regulates various functions on the vehicle 10, or as a powertrain control module (PCM) configured to control the powertrain 12 to generate a predetermined amount of power-source torque. The RESS 24 may be connected to the power-sources 14 and 20, the electronic controller 22, as well as other vehicle systems via a high-voltage BUS 25.

Figure 2:
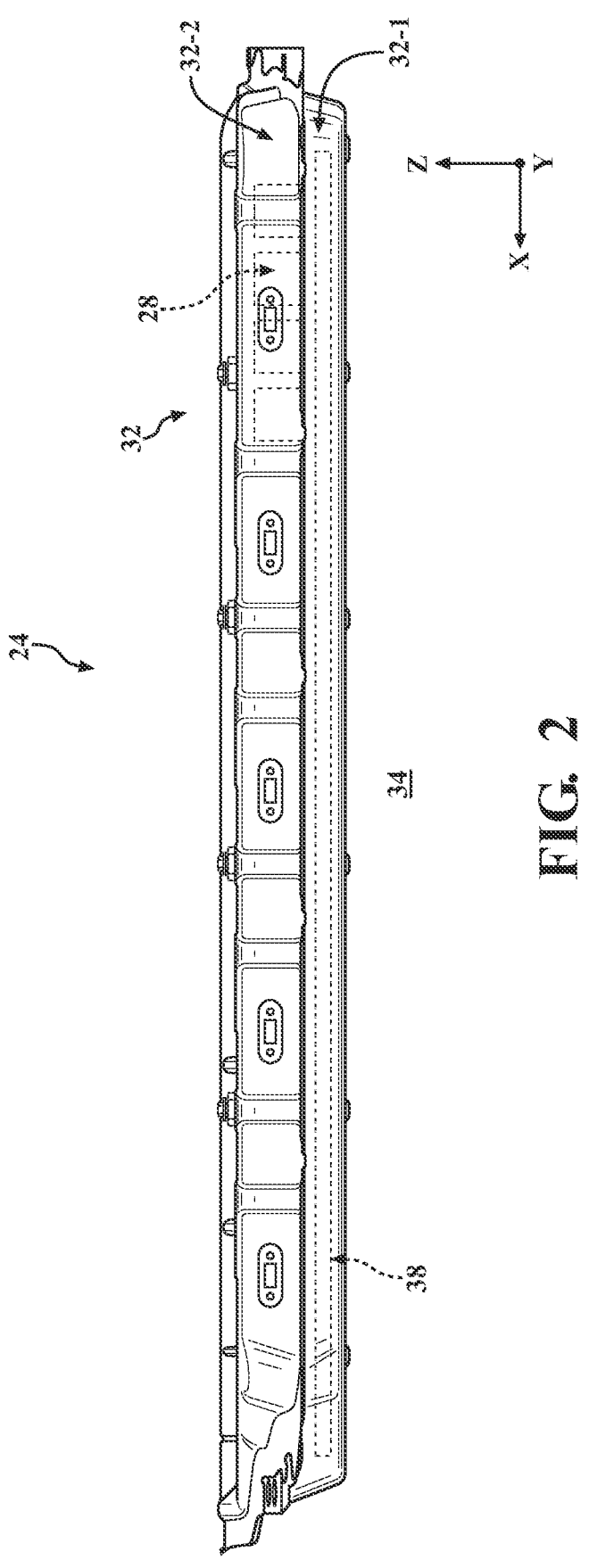
FIG. 2 is a schematic side view of the RESS shown in FIG. 1, illustrating battery cells arranged inside a battery system enclosure having a tray and a cover.

The RESS 24 includes a plurality of battery cells 28, which may be subdivided into battery groups or modules (shown as modules 26-1 and 26-2) and/or organized as a battery pack 27. As shown in FIG. 2, the battery cells 28 in each module of the RESS 24, such as the shown module 26-1 and module 26-2, are arranged in individual adjacent rows, such as a first row 30-1, a neighboring, directly adjacent, second row 30-2, as well as third and fourth rows 30-3 and 30-4. As shown, each battery cell 28 in rows 30-1, 30-2, 30-3, 30-4 may be configured as a cylindrical or a prismatic cell, extending generally upward in an X-Z plane. Although two modules, 26-1 and 26-2, with four rows 30-1, 30-2, 30-3, 30-4 of battery cells 28 in each module are shown, nothing precludes the RESS 24 from having a greater or fewer number of such modules and rows. The remainder of the present description will focus on module construction having four rows 30-1, 30-2, 30-3, 30-4 of battery cells 28, which may be adapted to a specific battery module having a desired overall quantity of cells.

As shown in FIG. 2, the RESS 24 also includes a battery pack or RESS enclosure 32 surrounded by an ambient environment 34, i.e., environment external to the RESS enclosure. The battery pack enclosure 32 is configured to house each row 30-1, 30-2, 30-3, 30-4 of the battery cells 28 in respective modules 26-1, 26-2 and includes an enclosure lower portion having an enclosure tray 32-1 and an upper portion having a mating enclosure cover 32-2 (shown in FIG. 2). The enclosure cover 32-2 is configured to engage the enclosure tray 32-1 to substantially seal the RESS enclosure 32 and its contents from the external environment 34. As shown, the RESS enclosure 32 is arranged in a horizontal X-Y plane, such that the enclosure cover 32-2 is positioned above the enclosure tray 32-1 when viewed along a Z-axis.

Figure 3:
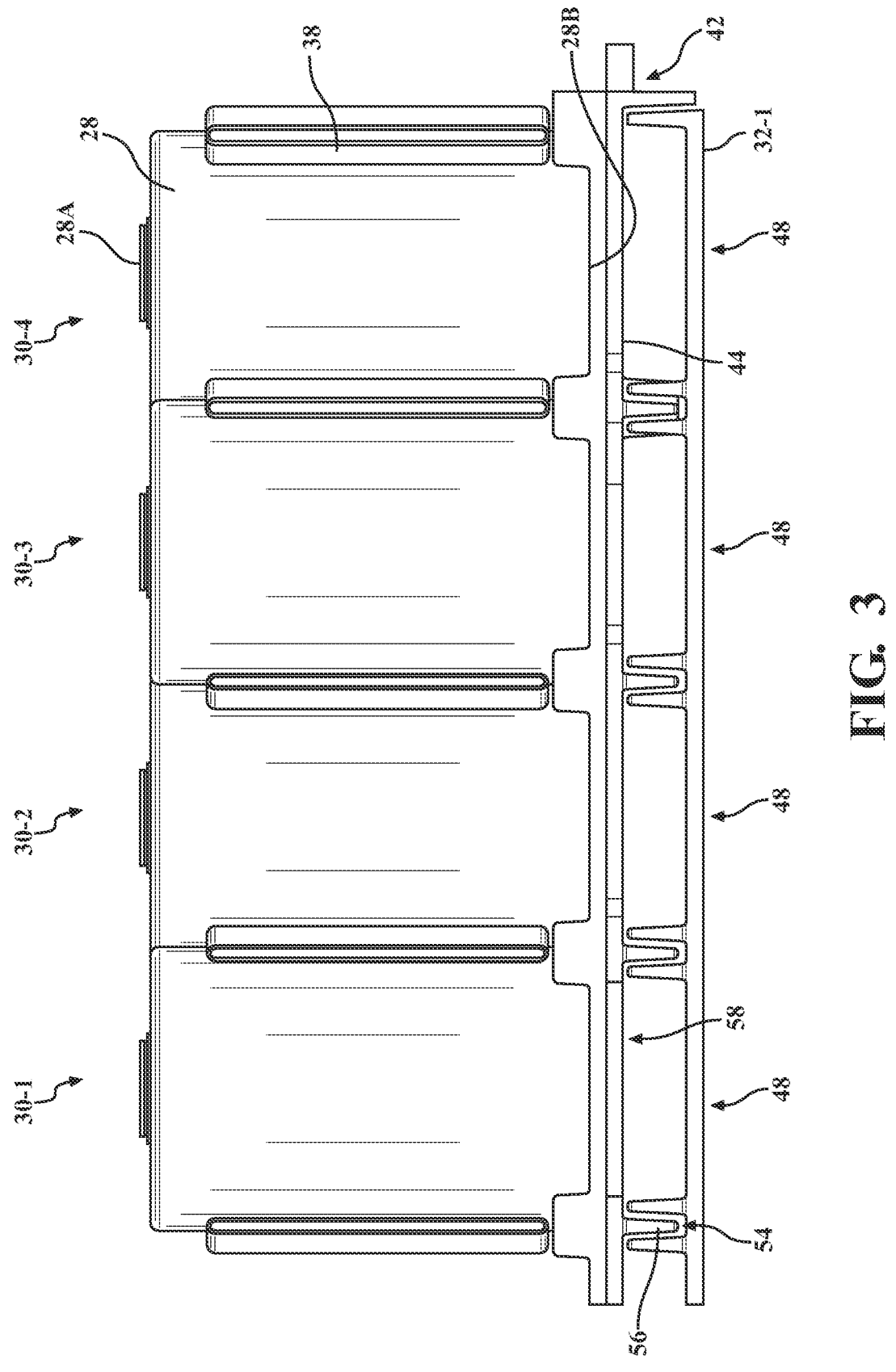
FIG. 3 is a close-up schematic plan view of the RESS shown in FIG. 1, illustrating battery cells arranged in rows on a cell support assembly with thermal runaway mitigation, according to the disclosure.
Figures 4, 5:
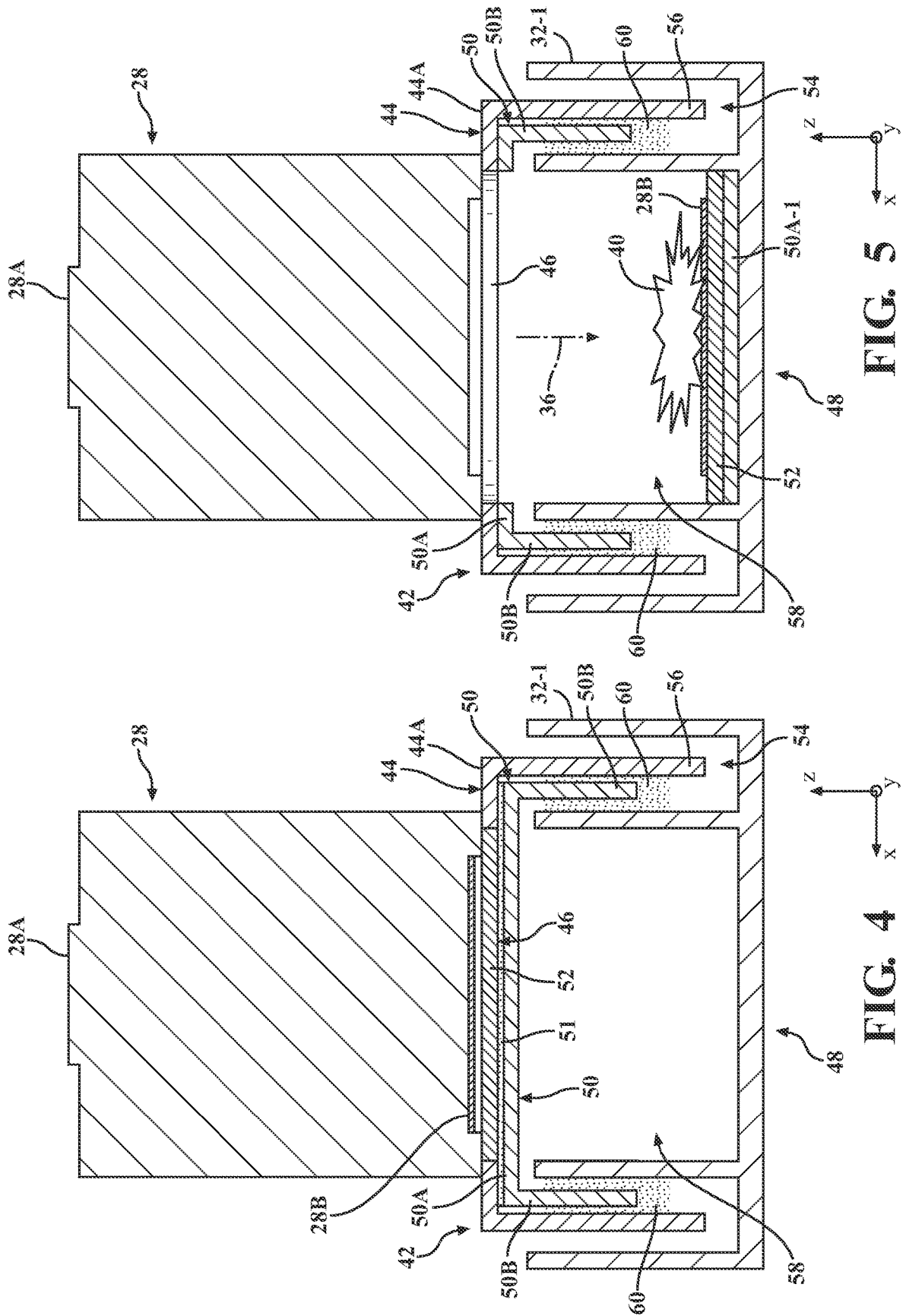
FIG. 4 is a close-up schematic partial plan view of the RESS shown in FIG. 3, illustrating the cell support assembly having a cell holder defining apertures aligned with battery cell vents, thermal-barrier strips adhered to the cell holder, and a plurality of potting elements, according to the disclosure.
FIG. 5 is a close-up schematic partial plan view of the RESS shown in FIG. 4, illustrating a battery cell undergoing a thermal runaway and a corresponding response of the cell support assembly, according to the disclosure.

As shown in FIGS. 3 and 4, each battery cell 28 generally includes electrical terminal(s) 28A and respective cell vent(s) 28B configured to expel or vent high-pressure gases 36 (illustrated in FIG. 5). Such gases 36 may be generated within the battery cell 28 as a byproduct of a cell thermal runaway event. As shown in FIGS. 2 and 3, the RESS 24 may also include a heat sink 38. The heat sink 38 is generally positioned between or below and in direct contact with the battery cells 28 to thereby absorb thermal energy from the respective battery cells. The heat sink 38 may be configured as a coolant plate having a plurality of coolant channels configured to circulate a coolant and thereby remove thermal energy from the battery cells 28 while the RESS 24 generates/stores electrical energy.

Generally, during normal operation of the RESS 24, the heat sink 38 is effective in absorbing thermal energy released by the battery cells 28. However, during extreme conditions, such as during a thermal runaway event (identified via numeral 40 in FIG. 5), the amount of thermal energy released by the cell undergoing the event may saturate the heat sink 38 and exceed capacity of the RESS 24 to efficiently transfer heat, e.g., from the RESS enclosure 32 to the ambient environment 34. As a result, excess thermal energy will typically be transferred between the neighboring battery cells 28 and between neighboring cell modules 26, leading to propagation of the thermal runaway through the RESS 24. The term "thermal runaway event" generally refers to an uncontrolled temperature increase in a battery system. During a thermal runaway event, the generation of heat within a battery system or a battery cell exceeds the dissipation of heat, thus leading to a further increase in temperature. A thermal runaway event may be triggered by various conditions, including a short circuit within the cell, improper cell use, physical abuse, manufacturing defects, or exposure of the cell to extreme external temperatures.

For example, in the event one or more battery cells 28 in one cell module 26 experiences the thermal runaway event 40, excess gases 36 generated during such an event would give rise to highly elevated internal cell pressures having tendency to break open the respective cell vent 28B. In the event of such gas venting, the expelled high-temperature gases 36 (with temperatures up to 1,500 degrees Celsius) may additionally send cell debris through the enclosure 32, triggering a thermal runaway of other neighboring battery cells 28 and cell modules 26. Accordingly, such transfer of high-temperature gases 36 typically increases the likelihood of a chain reaction affecting a significant part of the RESS 24.

As shown in FIGS. 3-5, the RESS 24 also includes a cell support assembly 42 with thermal runaway mitigation arranged inside the enclosure 32. Although not shown, the enclosure 32 may additionally include a cell support structure arranged proximate the battery electrical terminals 28A for general stability of constituent battery cells 28. The cell support assembly 42 includes a cell holder 44 configured to support, e.g., position and retain, the battery cells 28. The cell holder 44 may be constructed from a glass-filled nylon or another temperature resistant and tough material enabling a rigid and stable cell holder structure. The cell holder 44 includes a holder body 44A (shown in FIGS. 4 and 5) defining a plurality of apertures 46 arranged in rows 48. When battery cells 28 are installed in the cell holder 44, the battery cell rows 30-1, 30-2, 30-3, 30-4 are arranged in and coincide with corresponding cell holder rows 48, such that each aperture 46 aligns with and is in fluid communication with the cell vent 28B of one of the constituent battery cells.

With continued reference to FIGS. 4 and 5, the cell support assembly 42 also includes a plurality of thermal-barrier strips 50 (which may be constructed from FRB paper) having one side thereof coated with an adhesive 51. As shown, the thermal-barrier strips 50 are in physical contact with and adhered to the cell holder 44. Each thermal-barrier strip 50 extends parallel to a respective row 48 of apertures 46 (shown in FIG. 5) and is configured to thermally insulate corresponding battery cells 28 from gases 36 expelled by neighboring battery cells 28 during the thermal runaway 40. The cell support assembly 42 further includes potting elements 52 arranged in the apertures 46 of the cell holder 44 (shown in FIG. 4).

Each of the potting elements 52 may be formed from a non-self-leveling, highly-viscous paste applied into the respective one of the plurality of apertures 46 and cured to harden therein. Use of non-self-leveling material for the potting elements 52 is intended to maintain the potting elements' general shape, rather than permitting material to flow or run, prior to achieving a cured state. During a manufacturing process, to be described in detail below, such a paste may be spread and compacted into respective apertures 46 by an appropriate implement or tool. Alternatively, each potting element 52 may have a preformed shape of a disc, subsequently inserted into a respective aperture 46. The potting elements 52 may be constructed or formed from a 3M TB5000 material. Furthermore, each potting element 52 may include therein a flame-retardant material, such as sodium-bicarbonate.

As shown in FIG. 4, when viewed in the X-Z plane, each potting element 52 is arranged in one of the apertures 46 between an individual battery cell 28 and a corresponding thermal-barrier strip 50 proximate the corresponding cell vent 28B. Each potting element 52 is configured to attach or adhere to the respective battery cell 28 and to the corresponding thermal-barrier strip 50 to maintain position of the subject battery cell on the cell holder 44. Accordingly, the thermal-barrier strips 50 with the adhesive 51 also serve as retainment film for the corresponding potting elements 52. To maintain the potting elements 52 inside the cell holder 44 during regular operation of the RESS 24, material of the potting elements may include additives configured to match a thermal expansion coefficient of the potting elements with a coefficient of thermal expansion of the cell holder 44. Thus positioned, the constituent battery cells 28, the cell holder 44, the thermal-barrier strips 50, and the potting elements 52 are housed within and retained by the RESS enclosure 32.

As shown in FIGS. 3-5, the cell holder 44 may be configured to engage and fit together, such as slot in, with the enclosure tray 32-1. Specifically, as shown, the enclosure tray 32-1 may include multiple channels 54 and the cell holder 44 may include multiple integral projection or partition portions 56. Each cell holder projection portion 56 may be configured to engage one of the enclosure tray channels 54, thereby establishing a plurality of longitudinal fluid passages 58. Thus formed, each fluid passage 58 may extend along and below at least one of the rows 48 of apertures 46 to direct the gases 36 expelled by corresponding battery cell(s) 28 positioned on the cell holder 44. With specific reference to FIGS. 4-5, each of the thermal-barrier strips 50 may include a strip main body 50A and side strip sections 50B folded and arranged substantially perpendicular, i.e., orthogonally, relative to the strip main body and the respective row 48 of apertures 46. Each of the strip sections 50B is disposed parallel to the integral projection portions 56 and extends into a respective enclosure tray channel 54 between the enclosure tray 32-1 and the corresponding holder projection portion.

The RESS 24 may additionally include an adhesive 60 arranged inside the enclosure tray channel 54 between enclosure tray 32-1 and the corresponding holder projection portion 56 to thereby fix the cell support assembly 42 to the enclosure tray. During thermal runaway event 40, each of the potting elements 52 may be configured to be dislodged and separate from the respective aperture 46 under a force of the expelled gases 36. As a result of such venting of a specific battery cell 28, the dislodged potting element 52 is intended to also break away a portion 50A-1 of the corresponding barrier strip main body 50A. Consequently, the corresponding aperture 46 becomes unobstructed to direct expelled gases 36 into the longitudinal fluid passage 58. Each fluid passage 58 may in turn channel the expelled gases 36 and debris, such as battery cell internals, potting element(s) 52, and barrier strip portion(s) 50A-1, out of the RESS enclosure 32 to the external environment 34.

Figure 6:
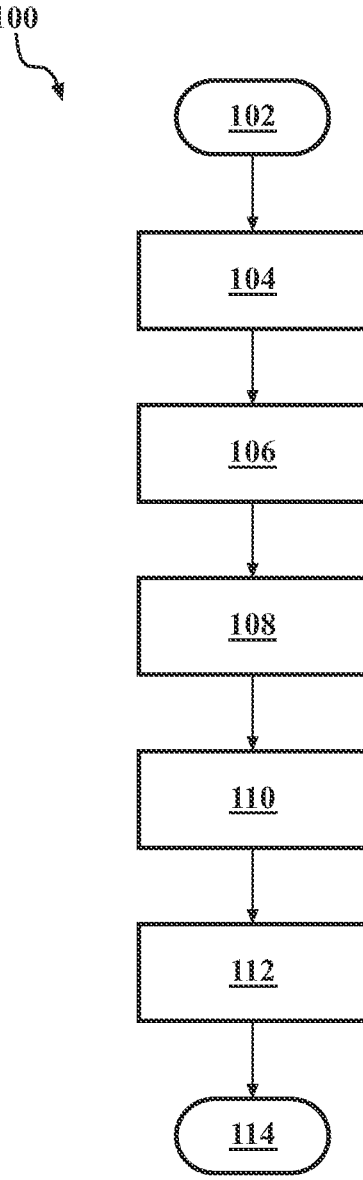
FIG. 6 is a flowchart for an embodiment of a method of constructing the cell support assembly for a multi-cell rechargeable energy storage system (RESS) shown in FIGS. 1-5, according to the present disclosure.
Figure 7:
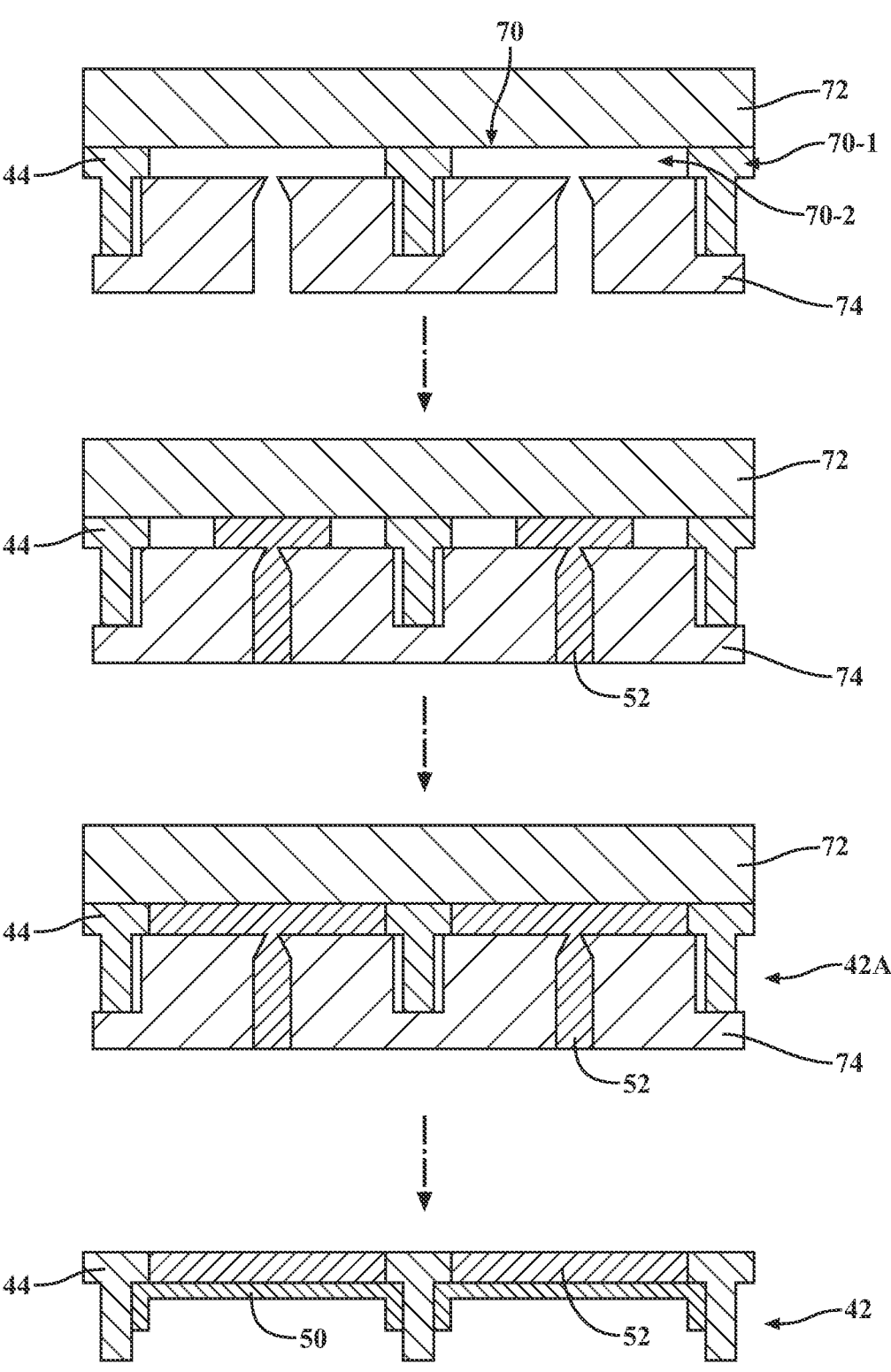
FIG. 7 illustrates an upper mold being engaged with a lower mold to form a cavity for forming the cell support assembly, according to the method of FIG. 6.

A method 100 of constructing the cell support assembly 42 with thermal runaway mitigation for the multi-cell rechargeable energy storage system (RESS) 24, is shown in FIG. 6 and described below with reference to the structure shown in FIGS. 1-5 and a manufacturing process shown in FIG. 7. Method 100 may be generally described as a two-shot molding process. Method 100 commences in frame 102 with forming, such as via molding, the cell holder 44 with multiple rows 48 of apertures 46. Following frame 102, the method advances to frame 104. In frame 104, the method includes arranging the formed cell holder 44 inside a die cavity 70 between an upper mold 72 and a lower mold 74. The die cavity 70 defines a first region 70-1 configured to accommodate the formed cell holder 44. The cavity 70 also defines a second region 70-2 configured to accommodate the potting elements 52, such that each potting element is arranged in one of the plurality of apertures 46. After frame 104, the method proceeds to frame 106.

In frame 106, the method includes introducing, e.g., injecting, the potting element 52 material into the second region 70-2 of the cavity, for example either through the upper mold 72 or the lower mold 74. After frame 106, the method proceeds to frame 108. In frame 108, the method includes curing the potting element 52 material inside the second region 70-2 of the cavity to incorporate the plurality of potting elements into the formed cell holder 44, such that each potting element is arranged in one of the plurality of apertures 46 and thereby forms a support sub-assembly 42A. Following curing of the potting element 52 material in frame 108, the method includes separating the upper and lower molds 72, 74 to remove the formed support sub-assembly 42A in frame 110.

After frame 110, the method advances to frame 112, where the method includes adhering a plurality of thermal-barrier strips 50, e.g., constructed from FRB paper, such as via the adhesive 51, to the formed support sub-assembly 42A on the underside of the cell holder 44. As a result, in frame 112 each thermal-barrier strip aligns with and is arranged to extend parallel to a respective row 48 of apertures 46 and each potting element 52 is arranged between a respective battery cell 28 and the corresponding thermal-barrier strip 50. After frame 112, the method may conclude in frame 114. The cell support assembly 42 may then be incorporated into the RESS enclosure 32 to facilitate routing expelled gases 36 from individual cells 28 into thermally insulated fluid passages 58 and thereby protect neighboring battery cells during a thermal runaway 40.

Figure 8:
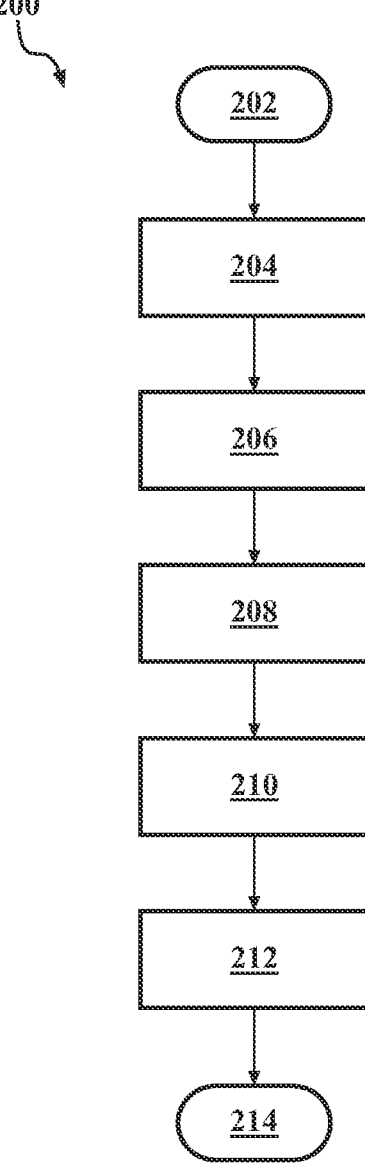
FIG. 8 is a flowchart for another embodiment of the method of constructing the cell support assembly for the RESS shown in FIGS. 1-5, according to the present disclosure.
Figure 9:
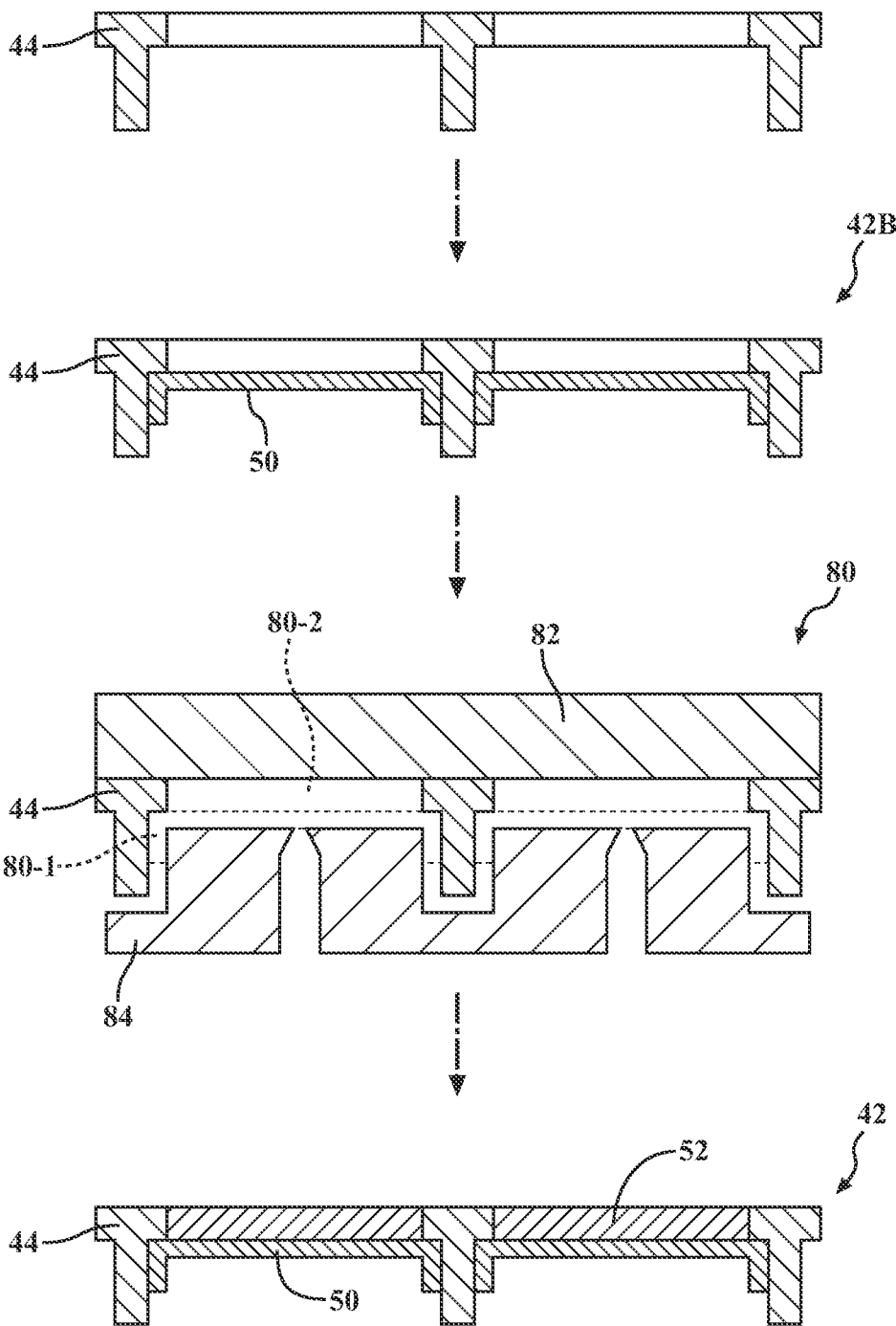
FIG. 9 illustrates an upper mold being engaged with a lower mold to form a cavity for forming the cell support assembly, according to the method of FIG. 8.

A method 200 of constructing the cell support assembly 42 with thermal runaway mitigation for the RESS 24 is shown in FIG. 8 and described below with reference to the structure shown in FIGS. 1-5 and a manufacturing process shown in FIG. 9. Similar to method 100 described above, method 200 may be considered a two-shot molding process. Method 200 commences in frame 202 with forming the cell holder 44 with multiple rows 48 of apertures 46. Following frame 202, the method advances to frame 204. In frame 204, the method includes adhering a plurality of thermal-barrier strips 50 to the cell holder 44, such that each thermal-barrier strip aligns with and extends parallel to a respective row 48 of apertures 46, thereby forming a support sub-assembly 42B. As described with respect to FIGS. 1-5, each thermal-barrier strip 50 may include the adhesive 51 applied to one side of the strip for adhering to the cell holder 44.

From frame 204, the method moves on to frame 206. In frame 206, the method includes arranging the formed cell holder 44 with the adhered plurality of thermal-barrier strips 50 (support sub-assembly 42B) inside a die cavity 80 between the upper mold 82 and the lower mold 84. The die cavity 80 defines a first region 80-1 configured to accommodate the formed support sub-assembly 42B. i.e., the cell holder 44 with the adhered thermal-barrier strips 50. The cavity 80 also defines a second region 80-2 configured to accommodate the potting elements 52, such that in the constructed cell support assembly 42 each potting element is arranged in one of the plurality of apertures 46. After frame 206, the method proceeds to frame 208.

In frame 208, the method includes introducing, e.g., injecting, the potting element 52 material into the second region 80-2 of the cavity 80, such as through the upper mold 82. After frame 208, the method proceeds to frame 210. In frame 210, the method includes curing the potting element 52 material inside the second region 80-2 of the cavity to incorporate the plurality of potting elements into the sub-assembly 42B (the formed cell holder 44 with the adhered thermal-barrier strips 50) to generate the cell support assembly 42. The generated cell support assembly 42 is permitted to cool to ambient or approximately room temperature prior to its assembly into the RESS 24. As a result, in an assembled RESS 24, each potting element 52 will be arranged in a respective aperture 46 between one battery cell 28 and the corresponding thermal-barrier strip 50 proximate the corresponding cell vent 28B.

Additionally, in frame 210, each potting element 52 will attach and adhere to the corresponding battery cell 28 arranged above and to the corresponding thermal-barrier strip 50 arranged below to maintain position of the subject battery cell on the formed cell holder 44. Following curing of the potting element 52 material in frame 210, the method includes separating the upper and lower molds 82, 84 to remove the constructed cell support assembly 42 in frame 212. After frame 212, the method may conclude in frame 214. The completed cell support assembly 42 may then be incorporated into the RESS enclosure 32 to provide the RESS 24 with thermal runaway mitigation.

Figure 10:
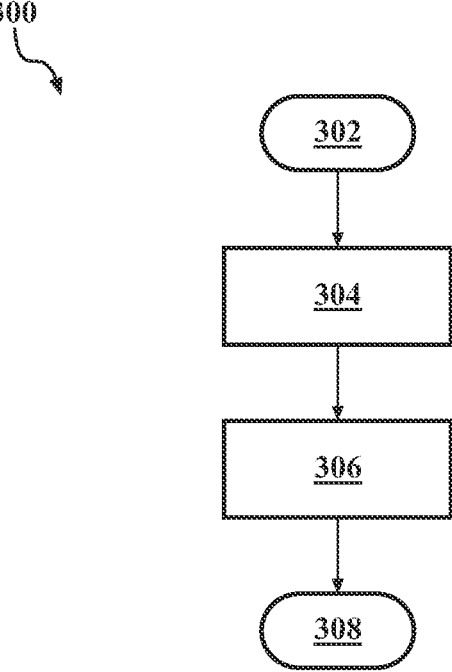
FIG. 10 is a flowchart for another embodiment of the method of constructing the cell support assembly for the RESS shown in FIGS. 1-5, according to the present disclosure.
Figure 11:
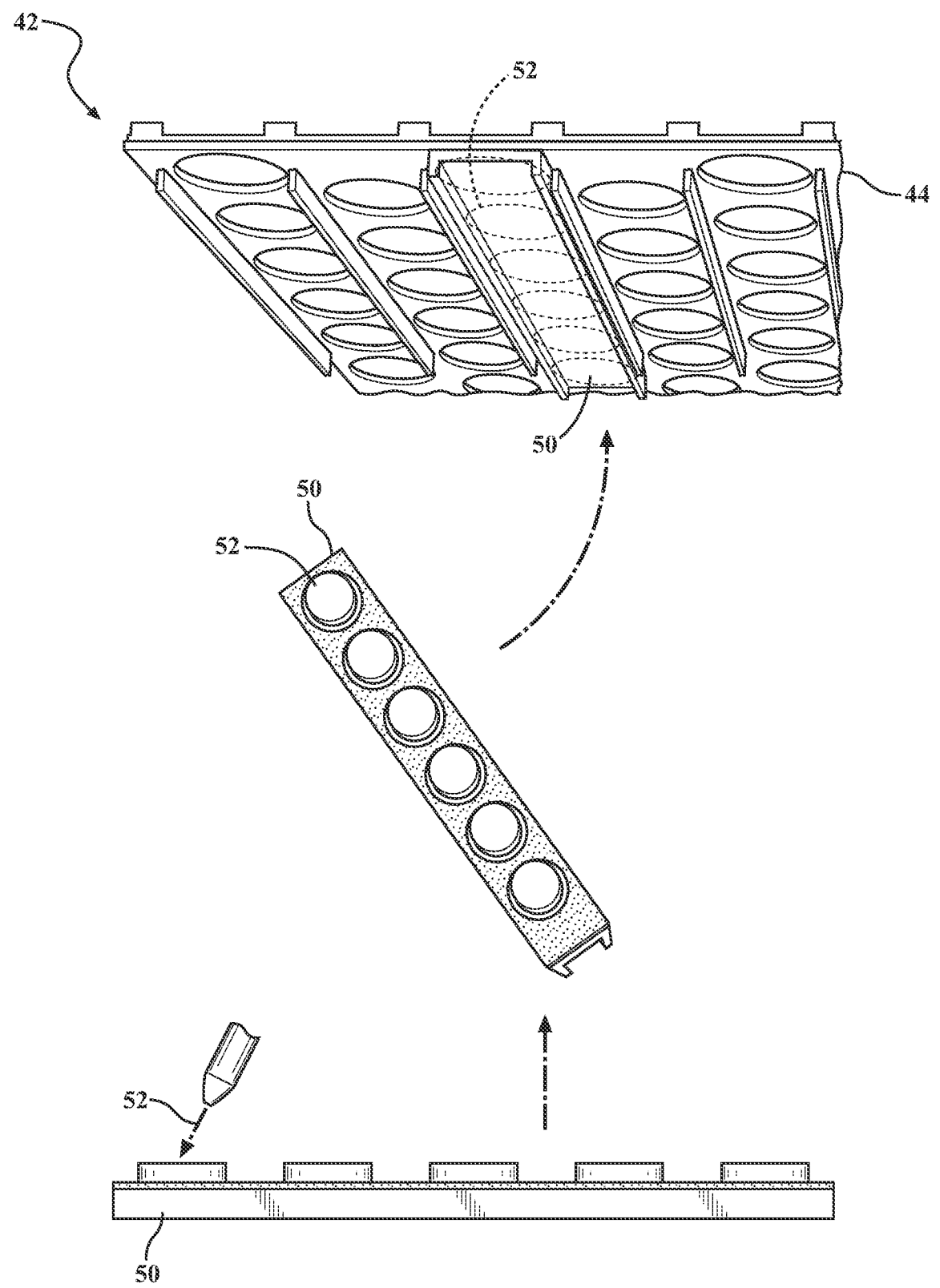
FIG. 11 illustrates assembly of the cell holder, thermal-barrier strips, and potting elements to form the cell support assembly, according to the method of FIG. 10.

A method 300 of constructing the cell support assembly 42 for the RESS 24, is shown in FIG. 10 and described below with reference to the structure shown in FIGS. 1-5 and a manufacturing process shown in FIG. 11. Method 300 may be generally described as a molding-casting process. Method 300 commences in frame 302 with forming, e.g., molding, the cell holder 44. Following frame 302, the method advances to frame 304. In frame 304, the method includes applying the potting element 52 material onto multiple thermal-barrier strips 50 to thereby form thereon and adhere thereto, using the adhesive 51, a plurality of individual potting elements. After frame 304, the method moves on to frame 306.

In frame 306, the method includes adhering the thermal-barrier strips 50 with the adhered potting elements 52 to the formed cell holder 44 to generate the cell support assembly 42. Thus, arranged on and fixed to the cell holder 44, each of the thermal-barrier strips 50 will align with and extend parallel to a respective row of apertures 46 to thermally insulate corresponding battery cells 28 from gases 36 expelled by neighboring battery cells during the thermal runaway 40. Furthermore, each potting element 52 will then be arranged in a respective aperture 46 between the battery cell 28 and the corresponding thermal-barrier strip 50 proximate the corresponding cell vent 28B. Each potting element 52 will also adhere to the corresponding battery cell 28 to maintain position of the subject battery cell on the cell holder 44. After frame 306, the method may proceed to and conclude in frame 308.

Overall, methods 100, 200, and 300 are intended to generate a cell support assembly with thermal runaway mitigation for a multi-cell rechargeable energy storage system, such as the RESS 24. The disclosed methods arrange potting elements inside apertures defined by a battery cell holder and supporting thermal-barrier strips under the apertures. In the RESS 24, the generated cell support assembly aligns the thermal-barrier strips with the battery cell holder apertures along individual battery cell rows and the potting elements are trapped between the battery cells and respective thermal-barrier strips. The potting elements are intended to adhere to the respective battery cells adjacent or directly across from corresponding cell gas vents. The thermal-barrier strips have an adhesive to maintain the strips' position relative to the cell holder and keep the potting elements in place. The thermal-barrier strips may also have folded sides to insulate longitudinal fluid exhaust passages in the RESS enclosure and block thermal runaway energy from affecting adjacent rows of battery cells. As a result, the above structure operates to channel thermal runaway energy away from the affected battery cell(s) and out of the RESS enclosure without triggering thermal runaway in adjacent cells.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of constructing a cell support assembly with thermal runaway mitigation for a multi-cell rechargeable energy storage system (RESS) having a plurality of battery cells with respective cell vents for expelling gases, the method comprising:

forming a cell holder, wherein the cell holder is configured to support the plurality of battery cells and has a holder body defining a plurality of apertures arranged in rows, and wherein each aperture is configured to align and be in fluid communication with the cell vent of one of the plurality of battery cells;

arranging the formed cell holder inside a cavity between an upper mold and a lower mold, wherein the cavity defines a first region configured to accommodate the formed cell holder and a second region configured to accommodate a plurality of potting elements, such that each potting element is arranged in one of the plurality of apertures;

introducing a potting element material into the second region of the cavity;

curing the potting element material inside the second region of the cavity to incorporate the plurality of potting elements into the formed cell holder, such that each potting element is arranged in one of the plurality of apertures and thereby forms a support sub-assembly;

separating the upper and lower molds to remove the formed support sub-assembly;

adhering a plurality of thermal-barrier strips to the formed support sub-assembly to construct the cell support assembly, wherein:

each thermal-barrier strip extends parallel to a respective row of apertures, such that each potting element is arranged between a respective battery cell and the corresponding thermal-barrier strip and configured to adhere to the battery cell and to the corresponding thermal-barrier strip to maintain position of the battery cell on the formed cell holder; and each thermal-barrier strip is configured to thermally insulate corresponding battery cells from gases expelled by neighboring battery cells during a thermal runaway.

2. The method of claim 1, wherein introducing the potting element material into the second region of the cavity includes forming each of the potting elements from a non-self-leveling paste.

3. The method of claim 2, wherein the non-self-leveling paste includes additives configured to match a thermal expansion coefficient of the potting elements with a coefficient of thermal expansion of the cell holder.

4. The method of claim 1, wherein each of the potting elements includes a flame-retardant material.

5. The method of claim 1, wherein forming the cell holder includes constructing the cell holder from a glass-filled nylon.

6. The method of claim 1, wherein each of the thermal-barrier strips has folded sides extending perpendicular to a respective row of apertures.

7. The method of claim 1, wherein adhering the plurality of thermal-barrier strips to the formed support sub-assembly is achieved via an adhesive coating one side of each respective thermal-barrier strip.

* * * * *